Sept. 21, 1926. Re. 16,424
E. D. CARY
MOLD HANDLING APPARATUS
Original Filed Jan. 8. 1921 3 Sheets-Sheet 1
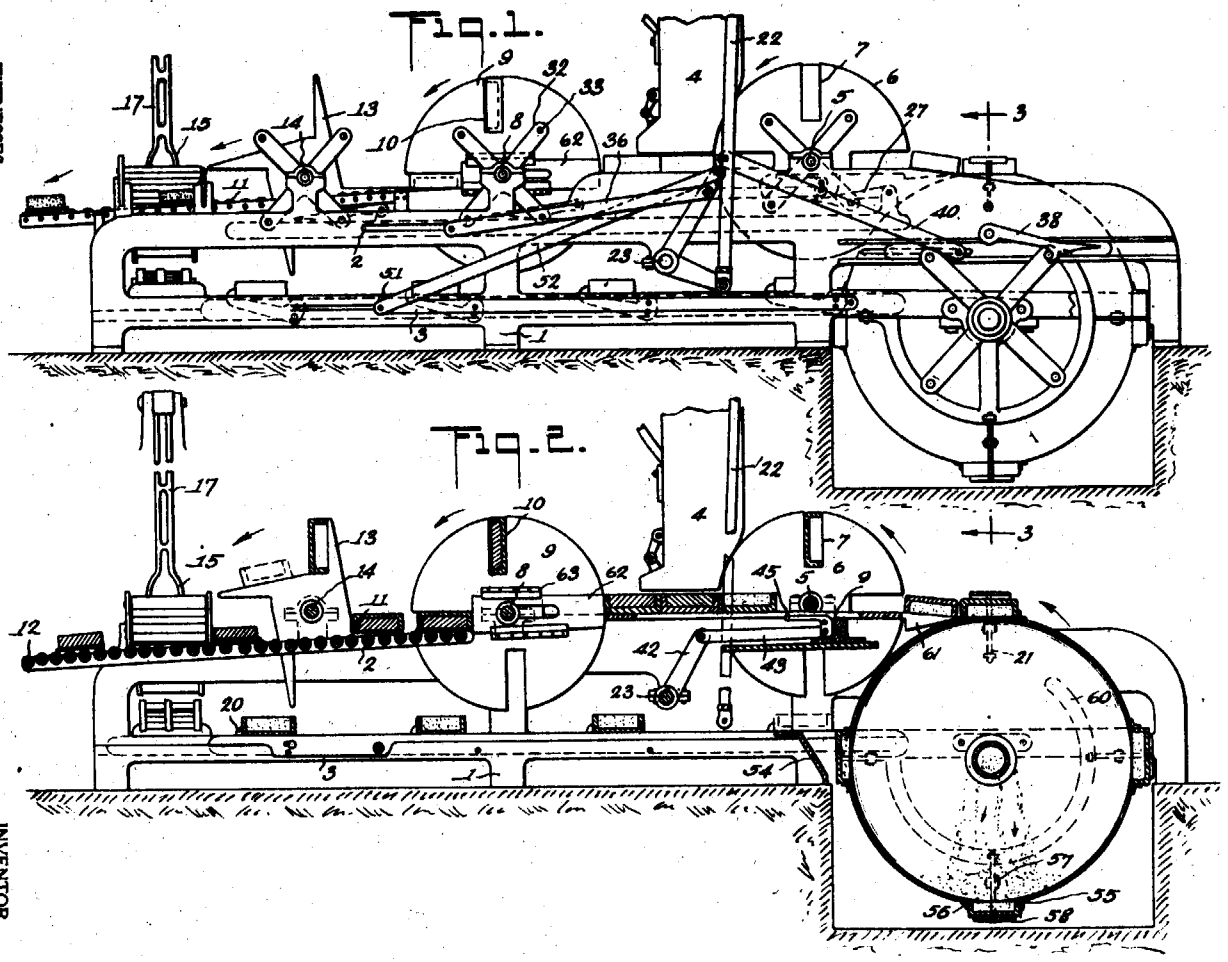
WITNESSES
INVENTOR
E. D. CARY
BY
ATTORNEYS Sept. 21, 1926. Re. 16,424
E. D. CARY
MOLD HANDLING APPARATUS
Original Filed Jan. 8. 1921 3 Sheets-Sheet 2
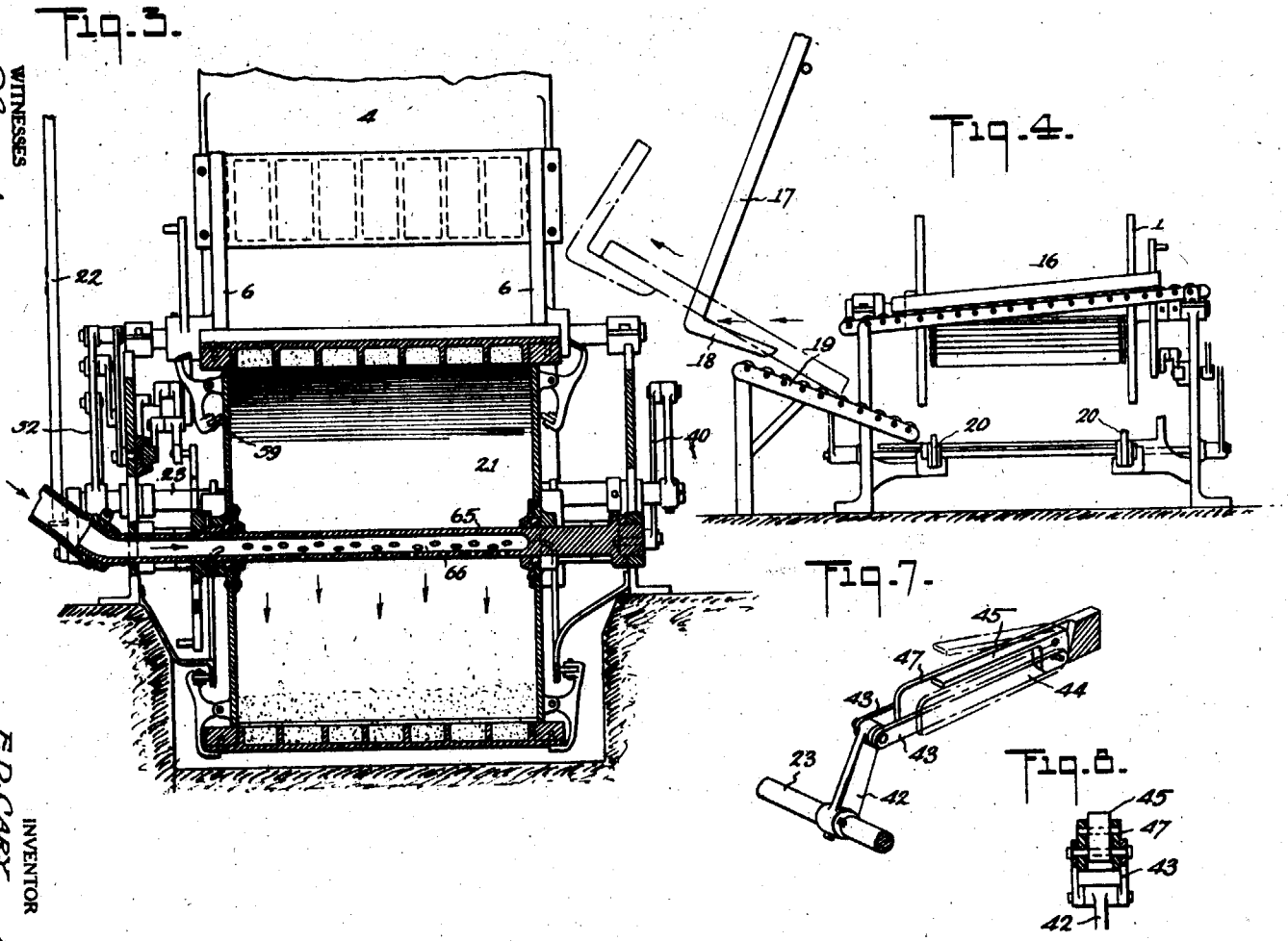
WITNESSES
INVENTOR
E. D. CARY
BY Munn & Co.
ATTORNEYS Sept. 21, 1926. Re. 16,424
E. D. CARY
MOLD HANDLING APPARATUS
Original Filed Jan. 8, 1921 3 Sheets-Sheet 3
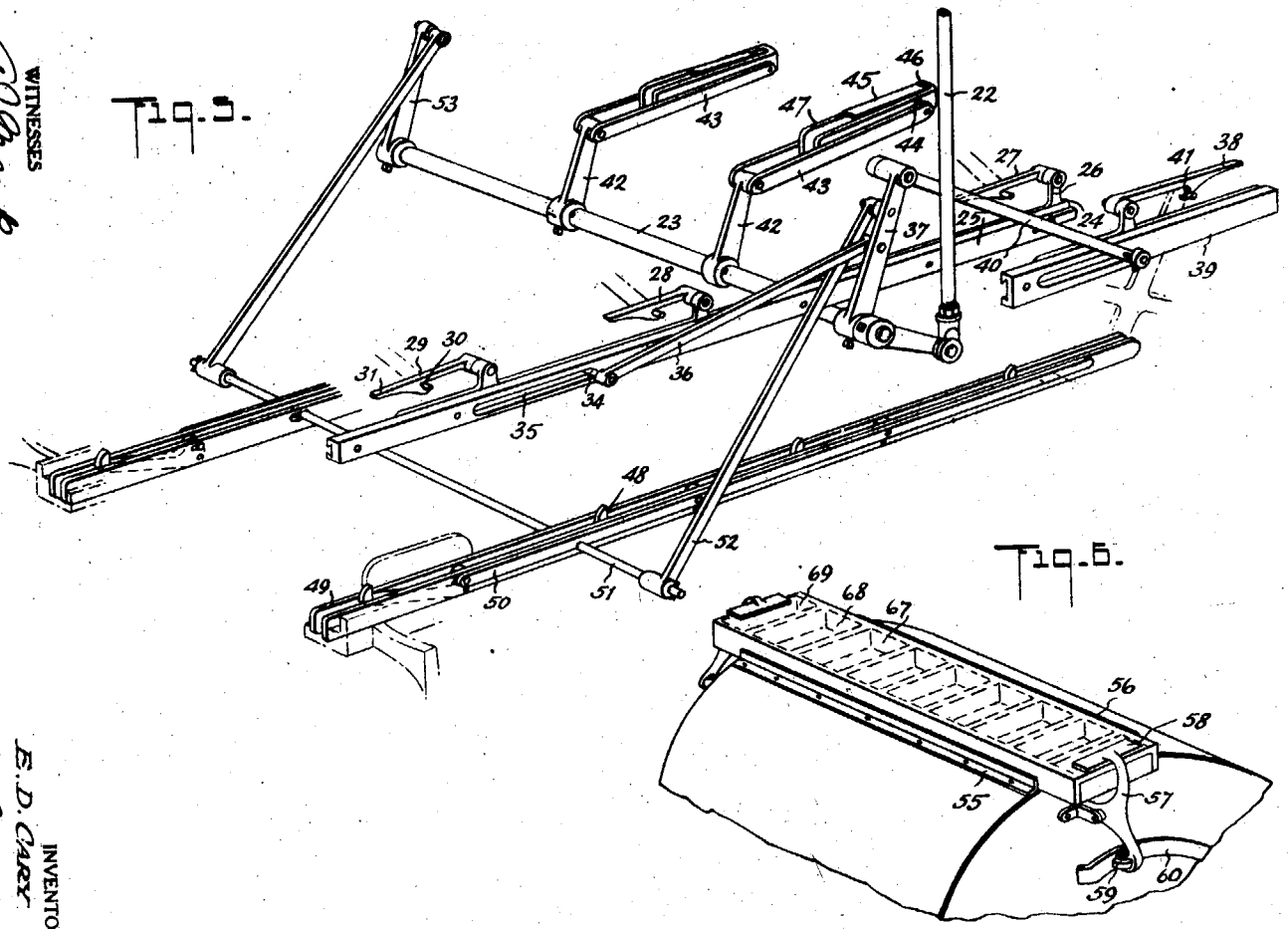
WITNESSES
INVENTOR
E. D. CARY
BY
ATTORNEYS Reissued Sept. 21, 1926. Re. 16,424

UNITED STATES PATENT OFFICE.

EDWARD D. CARY, OF NEW YORK, N. Y.

MOLD-HANDLING APPARATUS.

Original No. 1,425,449, dated August 8, 1922, Serial No. 435,853, filed January 8, 1921. Application for reissue filed April 30, 1926. Serial No. 105,877.

This invention relates to mold handling and conveying apparatus, designed particularly to be used in conjunction with any type of brick molding machine, and adapted in use to direct the molds into proper position with respect to the brick machine, to thereby receive the material, convey such molds from the brick machine and discharge the brick from the molds, direct the discharged brick to a point of discharge, convey the empty molds to a sander in which the interior of the mold is sanded to prevent the brick material sticking thereto, and deliver the sanded mold into proper position with relation to the brick machine, thus completing a cycle of operation.

The improved machine is entirely automatic in its operation with all parts driven, if preferred, from the motive power of the brick machine, and each and every part of the improved apparatus turned with relation to every other part and operated entirely without the use of chains, gears, belting or the like with the advantage of avoiding irregularity of operation and the frequent necessity for repair and adjustment necessitated by such particular driving means.

In the drawings,

Fig. 1 is a side elevation of the improved apparatus;

Fig. 2 is a longitudinal central section of the same;

Fig. 3 is an enlarged transverse section on line 3—3 of Fig. 1;

Fig. 4 is a rear end elevation of the machine;

Fig. 5 is a perspective view showing the operating means for the various moving parts of the apparatus and for compelling the travel of the mold;

Fig. 6 is a perspective view showing the mold secured upon the standing wheel;

Fig. 7 is a detail perspective showing the operation of the feeding fingers;

Fig. 8 is a transverse section of the same.

The apparatus comprises a main frame 1 which for the sake of the present description may be said to comprise an upper trackway 2 and a lower trackway 3. A brick machine 4 of any usual or preferred type is mounted so as to discharge the material therefrom onto the upper trackway at a particular point to be hereinafter referred to, and the respective parts of the apparatus to be described are arranged with more or less particular relation to such brick machine. The shaft 5 is mounted in suitable bearings on the upper trackway in rear of the brick machine, considering the direction of movement of the molds, and on this shaft are fixed spaced discs 6, having aligned recesses 7 of a size and shape to receive the mold. The discs together constitute what will be hereinafter termed the mold positioning wheel, and the recesses, preferably four in number and arranged in diametrically opposed pairs, receive the mold and deliver the same into a position to be moved beneath the brick machine.

A shaft 8 is mounted in the upper trackway in advance of the brick machine on which is arranged spaced discs 9 together constituting what will be hereinafter termed the mold reversing wheel, these discs being formed with mold receiving slots or recesses 10, also preferably four in number relatively offset from the diametric line as shown. The upper trackway 2 in advance of the mold reversing wheel is in the form of a downwardly and forwardly inclined gravity conveyor 11, made up of side supports and a series of freely rotatable rollers 12 constituting the bed of such conveyor. This conveyor extends between the discs 9 of the mold reversing wheel and terminates at the opposite end for a proper discharge. The end of the conveyor between the discs of the mold reversing wheel is on a plane lower than that of the trackway beneath the brick machine, so that as the molds are reversed by the wheel and the bricks delivered therefrom on the pallet board support, said support and bricks will be delivered onto such conveyor and gravitate to the discharge end of the conveyor. In advance of the mold reversing wheel is a mold discharge wheel made up of spaced arms 13 mounted upon a shaft 14 supported on the frame work in the plane of the upper trackway, the arms 13 picking up the molds from the conveyor and delivering them to a lateral mold conveyor 15 also made up of a roller bed 16 by which the molds are conveyed laterally of the main frame, as shown in Fig. 4. The mold conveyor extends some distance to one side and arranged beyond the end of such conveyor and pivotally supported at a point above the same is a swing arm 17 having a lateral or a receiving end 18, which as the end of the mold rides off the mold conveyor receives such advanced end of the mold and under the impetus, the swing arm moves outwardly carried by the forward end of the mold until the rear end thereof drops off the mold conveyor and onto an oppositely inclined chute 19 also having a roller bed 20 by which the mold is directed back onto the lower trackway 3 of the main frame.

The molds are carried lengthwise the lower trackway to the forward end of the main frame and are there delivered to a sanding wheel 21 through which they are sanded and delivered to the positioning wheel hereinbefore referred to. The mold and various wheels such as the positioning wheel, reversing wheel, discharge wheel and sanding wheel are operated automatically and given a periodic limited movement in each step by step operation of the machine, and the mechanism for performing these various operations will now be described. An operating rod 22 which is given a reciprocating movement through suitable connection with the driving mechanism of the brick machine, or independent power as may be desired, rocks a shaft 23 supported in suitable bearings on the main frame between the upper and lower trackways and preferably beneath the brick machine. An operating bar 24 is movably supported upon a frame element 25 and carries, by means of uprights 26, pivotally mounted pawls 27, 28 and 29. These pawls are each formed on their lower sides to present hooks 30 and with extended nose portions 31 in advance of the hooks. The respective pawls 27, 28 and 29 are arranged adjacent the positioning, reversing and discharge wheels, and such wheels are provided with diametrically opposed arms 32 having lateral pins 33 to be engaged by the hook portions 30 of the pawls. The bar 24 is provided with a lateral pin 34 extending through slot 35 in the frame bar 25 and connected by a link 36 with an arm 37 secured to the rock shaft 23. As the shaft 23 is rocked in the operation of the device, the respective pawls 27, 28 and 29 will engage the particular pin 33 of the positioning, reversing and discharge wheels and impart a predetermined movement, as one quarter revolution to such wheels. The nose portion 31 of each pawl is of such length that following a predetermined movement of the wheel, the nose portion will overlie the next pin 33 of the particular wheel to be engaged, so that, as the shaft 23 is rocked in the opposite direction, the pawls will advance from the pin previously engaged and by the nose engagement of the next adjacent pin caused to ride on said pin to the new position, that is with the hook 30 engaged with such advanced pin, whereupon on the rocking of the shaft 23 in the opposite direction, the wheels are again given a quarter turn. The positioning, reversing and discharge wheels are thus advanced by a step by step movement through a quarter of a revolution at each movement. A corresponding pawl 38 supported in a frame bar 39 and operated by a link 40 from arm 37 is arranged to engage the pins 41 of the sanding wheel, to thus simultaneously advance the sanding wheel in a step by step movement through a one quarter revolution.

Secured upon the rock shaft 23 are spaced arms 42 connected at the upper ends by links 43 to a depending projection 44 of a dog 45 pivotally supported at 46 between frame bars 47 forming part of the upper trackway within the plane of the positioning wheel. The dogs 45 are, by means of the links 43 and their connection below the pivot of said dogs, adapted to have their forward or free ends elevated above the plane of the frame bars 47 for initial movement of the links 43 in one direction, and as the frame bars 47 are slidably mounted in the upper trackway, the continued movement of the links under the operation of the rock shaft 23 will move the elevated dogs in the direction of travel of the molds. These dogs are positioned when at their extreme limit of rearward movement in rear of the innermost edge of the mold in the positioning wheel next the brick machine, so that said mold will, in the operation of the parts, be forced from the positioning wheel and delivered beneath the brick machine.

The travel of the molds along the lower trackway 3 is also provided for through a series of dogs 48 pivotally supported between bars 49 movably mounted in the lower trackway and operated through links 50 as described in connection with the dogs 45. The links 50 are actuated through a rod 51 connected by bars 52 with the arm 37 and with the corresponding arm 53 of the opposite end of the rock shaft 23. The molds are thus given a step by step movement lengthwise the lower trackway, the reverse movement of the links 50 permitting the dogs to drop to ride beneath the next mold to be engaged as will be obvious.

The end of the lower trackway adjacent the sanding wheel terminates in a downwardly inclined section 54 by which the molds are turned and directed onto the sanding wheel with their open ends or faces against said wheel. The sanding wheel is provided with transverse abutments 55 and 56 between which the mold is received, and gripping members are arranged to hold the mold in proper position on the sanding wheel during movement of said wheel. These gripping members comprise arms 57 having hook ends 58 to engage over the ends of the mold, the opposite end of the arms having rollers 59 to bear upon fixed trackways 60 to press the hook ends of the arms into holding relation with the mold. As the mold reaches the uppermost position on the sanding wheel it is free of holding connection with the wheel as the previous termination of the trackways 60 permits the arms 57 to gravitate to a release position. The discharge position of the sanding wheel is immediately adjacent the positioning wheel, there being arranged intermediate the sanding wheel and positioning wheel spaced fingers 61, up which the mold is forced by the movement of the sanding wheel, and the bar 56 to the plane of the recess in the positioning wheel. A mold resting upon these fingers is of course forced into the positioning wheel recesses by the next or succeeding mold of the sanding wheel, as will be apparent.

The molds are forced from the reversing wheel through a plunger 62 slidably mounted upon the shaft 8 and held for reciprocating movement between guides 63. The forward end of the plunger is in position to eject the mold from the recesses of the reversing wheel next the arms of the discharge wheel, the ejecting movement of the plunger being provided through contact of the advancing mold from the brick machine. There is a plunger on each disc, each cooperating with two slots, so that after ejecting movement the turn of the wheel positions the plunger for the succeeding operation.

The shaft 65 on which the sanding wheel is rotatably mounted is hollow and formed with a series of openings 66 within the plane of the wheel, the shaft communicating with the sand supply, so that sand is delivered into the mold when in lowermost position on said wheel for sanding purposes, the sand accumulating in the wheel being readily distributed, that is, shaken into and out of the mold during movement of the sanding wheel in order that the mold may be properly sanded.

The mold is of usual form here shown as comprising a box like member 67 having brick or other compartments 68 and provided with end extensions 69 which may or may not be solid or otherwise built up, the extensions providing the additional length of mold necessary to permit such mold to be properly supported in the recesses and arms of the respective wheels, while having the brick or other molded material arranged wholly between the discs forming such wheels. This is essential as in the use of the reversing wheel the molds are carried from said wheel onto the arms of the discharge wheel and picked up leaving the brick on the pallet in contact with the gravity conveyor. Furthermore the extensions permit the handling of the mold by the respective wheels without contact with the material in the mold.

In the operation of the device, the positioning wheel, receiving in its successive recesses the molds from the sanding wheel, deliver such molds onto the upper trackway along which they are forced to a position beneath the brick machine and receive the material therefrom. The molds as they leave the brick machine are provided with a pallet 70 by the operator and then delivered into the reversing wheel and reversed onto the conveyor 11. The bricks resting on the pallet are thus discharged and moved off on the conveyor by gravity to a point of discharge. The molds are picked up by the arms of the discharge wheel and delivered onto the mold conveyor, and so on to the lower trackway. The molds are fed in succession lengthwise the lower trackway to the sanding wheel, properly sanded and delivered to the positioning wheel, thus completing the cycle of movement.

It will be noted particularly that all parts of the apparatus herein described are operated without the use of chains, belts, sprockets or the like and that every movement is coordinated with every other movement so that it is impossible for the machine to get out of time in its respective operations, and also the necessity for repair and renewal incident to ordinary modes of driving mechanism is obviated.

Claims:

1. The combination of a brick machine of a mold handling and conveying apparatus comprising means for delivering the molds in succession to the brick machine for filling, means for discharging the molded articles from the mold, means for delivering the empty molds to a sanding wheel, means to receive said molds in reverse position from the sanding wheel, and mechanism for operating said last mentioned means to deliver the reverse molds in proper position to the first mentioned means.

2. The combination of a brick machine of a positioning wheel for delivering molds to said machine for filling, a reversing wheel for reversing the molds to discharge the molded articles therefrom, a discharge wheel to discharge the empty molds, a conveyor for receiving the empty molds, and a sanding wheel to receive the molds from said conveyor.

3. A mold handling and conveying apparatus comprising a positioning wheel to receive the molds in succession, means to force the molds from the positioning wheel to a position to be filled, means for inverting the molds to discharge the contents theerof, a conveyor to receive said contents, and means to direct the molds laterally of the conveyor.

4. A mold handling and conveying apparatus comprising a positioning wheel to receive the molds in succession, means to force the molds from the positioning wheel to a position to be filled, means for inverting the molds to discharge the contents thereof, a conveyor to receive said contents, and means to direct the molds laterally of the conveyor, and means to return the molds to the positioning wheel.

5. A mold handling and conveying apparatus including a positioning wheel formed with diametrically opposed recesses to successively receive the empty molds, means for forcing the molds from said wheel in succession and to a position to be filled, a reversing wheel to reverse the molds onto a conveyor, and a discharge wheel to pick up the reversed molds from said conveyor to leave the molded articles on the conveyor.

6. A mold handling and conveying apparatus including a positioning wheel formed with diametrically opposed recesses to successively receive the empty molds, means for forcing the molds from said wheel in succession and to a position to be filled, a reversing wheel to reverse the molds onto a conveyor, and a discharge wheel to pick up the reversed molds from said conveyor to leave the molded articles on the conveyor, and a mold return conveyor arranged beneath said wheels.

7. A mold handling and conveying apparatus including a positioning wheel formed with diametrically opposed recesses to successively receive the empty molds, means for forcing the molds from said wheel in succession and to a position to be filled, a reversing wheel to reverse the molds onto a conveyor, and a discharge wheel to pick up the reversed molds from said conveyor to leave the molded articles on the conveyor, and a mold return conveyor arranged beneath said wheels, and means for imparting a step by step movement to said operating parts.

8. A mold handling and conveying apparatus including a positioning wheel formed with diametrically opposed recesses to successively receive the empty molds, means for forcing the molds from said wheel in succession and to a position to be filled, a reversing wheel to reverse the molds onto a conveyor, a discharge wheel to pick up the reversed molds from said conveyor to leave the molded articles on the conveyor, a mold return conveyor arranged beneath said wheels, and a sanding wheel to receive the molds from said mold return conveyor and deliver the same to the positioning wheel.

9. A mold handling apparatus comprising a trackway arranged in receiving relation to a brick machine, a positioning wheel formed with diametrically opposed recesses to successively receive and position empty molds in alignment with said trackway, means for forcing the aligned mold from the wheel and lengthwise the trackway means to successively receive said molds from the trackway and elevate and reverse the same, and means for separating the reversed mold from the articles therein.

10. A mold handling apparatus comprising a trackway arranged in receiving relation to a brick machine, a positioning wheel formed with diametrically opposed recesses to successively receive and position empty molds in alignment with said trackway, a reversing wheel to receive the filled molds and reverse the same, an article conveyor to receive the reversed molds, a discharge wheel to lift the molds from the articles, a discharge conveyor to receive the molds from the discharge wheel, and a swinging element to receive the molds from the discharge conveyor and change the direction of movement of said molds.

11. A mold handling apparatus including means for elevating and reversing filled molds, a conveyor to receive the reversed molds, means for elevating the molds from the conveyor to leave the molded articles on the conveyor, a lateral conveyor to receive the molds, a swing arm to deliver the molds to said lateral conveyor, a return conveyor for the molds, and means to transfer the molds from the lateral conveyor to the return conveyor.

12. A mold handling apparatus including a conveyor for the empty molds and a sand wheel to receive said molds from said conveyor, means on said sand wheel to hold the molds secured thereto for a portion of the movement of the wheel, means for delivering sand to the interior of the mold during the operation of the sand wheel, and means for delivering the molds from the sand wheel in reversed position.

13. A mold handling apparatus comprising a reversing wheel formed with recesses to receive the filled molds in succession and reverse the same for discharge, means for forcing the molds into cooperation with said wheel, and means slidably mounted on said reversing wheel and adapted to be operated by a mold moving into cooperation with said wheel to force a previously received mold from said wheel.

14. A mold handling apparatus comprising a positioning wheel for reversing and positioning the molds, a trackway arranged in cooperation with the brick machine, a reversing wheel for the mold, a discharge wheel for the molds, a return conveyor for the molds, a sanding wheel for the molds from which the molds are delivered to the positioning wheel in reversed position, a power driven rock shaft, and means operated by said rock shaft to actuate all of said operating parts.

15. The combination with a brick machine of a mold handling apparatus including means for sanding the molds, means for positioning the molds relative to the brick machine, means for reversing the molds beyond the brick machine, means for discharging the molds laterally of the apparatus, a return conveyor for delivering the molds to the sanding machine arranged on a plane below the lateral discharging means, and a swinging element to receive the molds from the lateral means and deliver said molds onto the return conveyor.

16. In a mold handling apparatus, means for receiving and reversing filled molds, means for discharging the filled molds therefrom, a discharge wheel having a plurality of arms operating to pick up the reversed molds and to free the molded articles therefrom and to again reverse the molds, a conveyor for removing the molded articles, a sanding means, and means for moving the empty molds to said sanding means.

17. In a mold handling apparatus a reversing wheel comprising spaced members having slots formed therein for receiving and reversing the filled molds, means for discharging the filled molds in reversed condition therefrom, a discharge wheel having spaced arms to pick up the reversed molds and free the molded articles therefrom and to again reverse the molds, a conveyor to remove the molded articles, a sanding means, and means for moving the empty molds to the said sanding means.

EDWARD D. CARY.